Patented Mar. 15, 1949

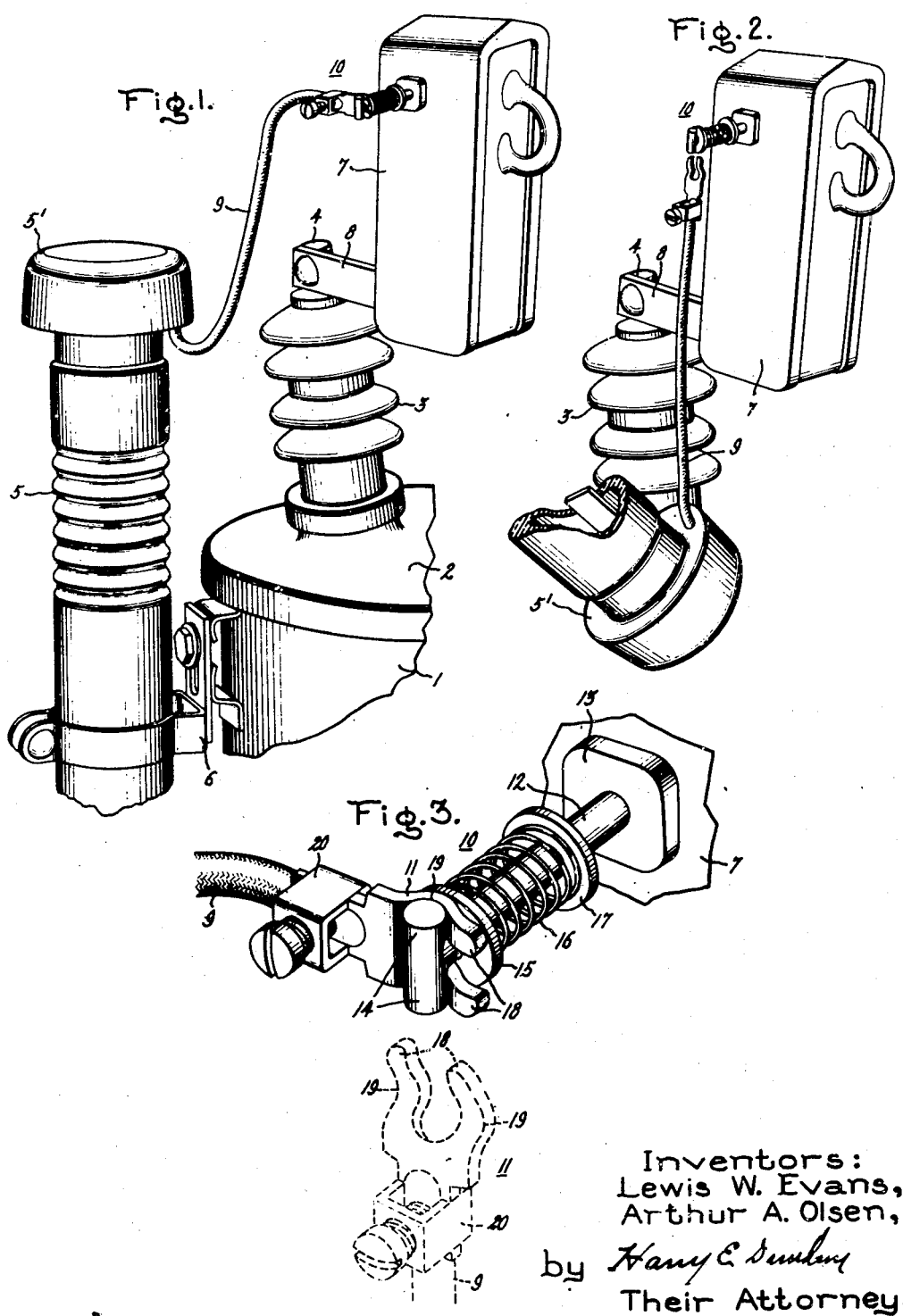

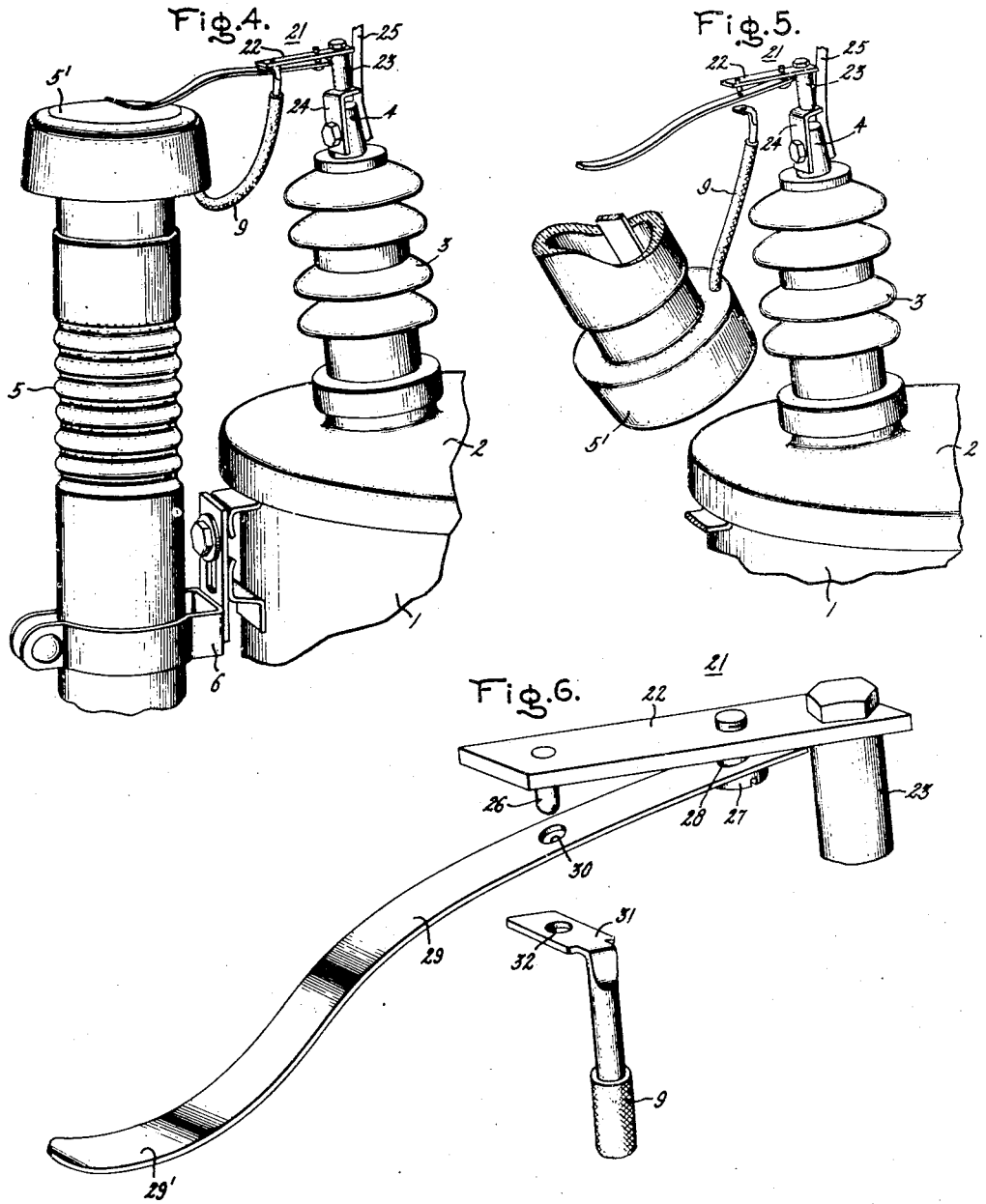

2,464,565

UNITED STATES PATENT OFFICE 2,464,565

DISCONNECTING DEVICE

Lewis W. Evans and Arthur A. Olsen, Pittsfield, Mass., assignors to General Electric Company, a corporation of New York Application February 8, 1945, Serial No. 576,820

4 Claims. (Cl. 175—30)

Our invention relates to disconnecting devices and more particularly to disconnecting devices which operate automatically to isolate two interconnected electrical devices from each other under predetermined conditions.

It has been the aim of most manufacturers of distribution transformers to combine with the transformer, protective devices such as lightning arresters, fuse cutouts and the like, both to simplify the installation in the field and to improve the appearance of such installation. In recent years it has been common practice to mount the lightning arrester on the transformer tank with the ground connection of the lightning arrester being connected to the tank which is grounded. The line terminal of the lightning arrester has customarily been connected to the transformer terminal or to the terminal of a cutout by a flexible lead, if external protection of the transformer is provided.

It has been discovered through actual field experience that heavy lightning strokes often destroy such lightning arresters by blowing them apart and as a result thereof the upper section of the lightning arrester is left dangling from the transformer bushing by the flexible lead in a position so as to engage the grounded tank, thereby short circuiting the power line connected to the transformer to the grounded tank. Such a short circuit would operate protective devices and cause the whole line section to be locked out until the damaged arrester was physically removed. It would be desirable to provide an arrangement which would eliminate the possibility of a damaged arrester short circuiting the power line to the grounded transformer tank.

Accordingly it is an object of our invention to provide an arrangement which will eliminate the difficulty enumerated above.

It is another object of our invention to provide a disconnecting means which will cause complete and automatic disconnection upon arrester failure in response to the weight of the arrester portion connected to the disconnecting means.

Still another object of our invention is to provide a new and improved disconnecting device for preventing dangling of an electrical device which has been destroyed, from a flexible conductor in a position to cause damage to an associated circuit or device.

Further objects and advantages of our invention will become apparent as the following description proceeds and the features of novelty which characterize our invention will be pointed out with particularity in the claims annexed to and forming a part of this specification.

For a better understanding of our invention reference may be had to the accompanying drawings in which Fig. 1 is a perspective view of a portion of a transformer combined with a lightning arrester and cutout employing the disconnecting means of our invention; Fig. 2 is a view similar to Fig. 1 showing operation of the disconnecting device immediately following destruction of the lightning or surge arrester; Fig. 3 is an enlarged perspective view of the disconnecting device of our invention in the position indicated in Fig. 1; Fig. 4 is a view similar to Fig. 1 illustrating a modification of our invention; Fig. 5 is a view similar to Fig. 2 illustrating the operation of the disconnecting device shown in Fig. 4, and Fig. 6 is an enlarged perspective view of the disconnecting device shown in Fig. 5.

Referring now to Figs. 1, 2, and 3 of the drawings, there is illustrated an electrical device which is specifically disclosed as a transformer having a tank 1 with a cover 2 from which extends a high voltage bushing 3 terminating in an electrical terminal 4. A protective device indicated in the form of a lightning arrester 5 is shown supported from the transformer tank 1 by suitable means generally indicated at 6. It will be understood that this lightning arrester or protective device may be any one of the well known types and for purposes of illustration has been indicated as a lightning arrester of the type disclosed and claimed in Lougee Patent 1,723,872, granted August 6, 1929, and assigned to the same assignee as the present application. It will be understood that the ground terminal (not shown) of lightning arrester 5 may suitably be connected to the transformer tank 1, which is usually grounded.

Transformers are generally provided with overcurrent protective devices which may be mounted internally of the transformer tank or externally thereof as is disclosed in Hermann Patent 2,163,398, granted June 30, 1939, and assigned to the same assignee as the present application. In Fig. 1 we have illustrated an overcurrent protective device in the form of the well known cutout generally indicated at 7, having one terminal thereof connected by conducting means 8 with the terminal 4 of the associated transformer. The other terminal of the cutout is connected to a suitable power line (not shown). Heretofore, the other terminal of the cutout was also connected by a flexible lead, such as the lead 9, with the line terminal of the lightning arrester, such as 5. It is obvious that with this arrangement if a heavy lightning stroke should destroy lightning arrester 5 by blowing it apart, the dangling lightning arrester part still fastened to flexible lead 9 might contact the grounded transformer tank and short circuit the high voltage terminal 4 and consequently the line connected thereto through overcurrent protective device 7. In accordance with our invention the flexible lead 9 is not connected directly to the other terminal of overcurrent protective device 7, but is connected through the disconnecting device of our invention, generally indicated at 10, and best shown in Fig. 3.

Disconnecting device 10 comprises a pair of separable members which in one relative position are interlocked, while in another relative position are readily separable, with suitable means being provided to hold yieldingly these members in the interlocked position. These members are designed so that the weight of the shattered lightning arrester top, designated as 5' in Fig. 2, will change the relative position of the members from the interlocked to the releasable position.

As is best shown in Fig. 3, the interlocking members comprise the conducting members 11 and 12. The member 12 is a T-shaped conducting member formed of rod-like material having the stem of the T connected to the upper terminal of the overcurrent protective device 7 and rigidly positioned by means of fastening devices such as 13 so that the arms 14 of the T-shaped rod-like member 12 are rigidly held in the vertical position as indicated. A washer 15 movable on the stem of the T-shaped member 12 is held in clamping engagement with the arms 14 by means of a compression spring 16 positioned between washer 15 and a washer 17 held in a predetermined position on the stem of T-shaped member 12.

The conducting member 11 is provided with a forked end including the tines 18 arranged so that the stem of T-shaped member 12 may be moved between the tines 18 when these tines are clamped between washer 15 and the arms 14 of rod-like T-shaped member 12. Each of these tines 18 is provided with a depression 19 so that when clamped between the arms of the T-shaped member 12 and washer 15, the rod-like arms 14 of the T-shaped member 12 fit into depressions 19. Member 11 is also provided with suitable clamping means 20 to which flexible lead 9 may be clamped. In the position indicated in Fig. 3 the members 11 and 12 are interlocked and held in good conducting relationship by spring means 16. In the event that the lightning arrester 5 is destroyed the weight of the top 5' pulling downwardly on the outer end of the member 11 which provides a lever arm when in a horizontal position as shown in Fig. 1, will cause rotation of the member 11 relative to the member 12. When the member 11 is rotated 90° in a counterclockwise direction as viewed in Fig. 3 from the position indicated in Figs. 1 and 3, it is released from member 12 and the lightning arrester portion 5' and flexible lead 9 may drop free with no danger of short circuiting the transformer or the line associated therewith. In Fig. 3 the member 11 is shown in dotted lines just after it has been rotated to its releasable position.

In view of the detailed description included above the operation of the disconnecting device of our invention will be obvious to those skilled in the art.

Where the lightning arrester is mounted closely adjacent to the electrical conductor to which it is connected, the modification of our invention illustrated in Figs. 4, 5, and 6 may be employed. In these figures the corresponding parts are designated by the same reference numerals as in Figs. 1 and 2. In this case the flexible lead 9 of the lightning arrester is directly connected to transformer terminal 4 through a modified disconnecting device of our invention, generally indicated at 21. This disconnecting device comprises a generally horizontally mounted conducting plate 22 electrically connected to and mechanically supported by terminal 4 through conducting members 23 and 24. Terminal 4 is also connected to an associated power line (not shown) by means of a conductor 25. The conducting plate 22 is provided with a downwardly extending pin 26 and an adjustable screw 27 which passes through a clearance hole 28 in a leaf spring 29. Screw 27 passing through clearance hole 28 provides a hinged connection between leaf spring 29 and conducting plate 22. Leaf spring 29 is also provided with an opening 30 into which pin 26 may be inserted when leaf spring 29 is held against conducting plate 22. Flexible conductor 9 is provided with an L-shaped terminal 31 provided with an opening 32. Terminal 31 is adapted to be inserted between leaf spring 29 and conducting plate 22 with pin 26 extending through both openings 32 and 30 in the manner indicated in Fig. 4. The end 29' of leaf spring 29 in the normal condition of disconnector 21 is adapted to bear against the top 5' of lightning arrester 5 so as to hold terminal 31 firmly in position between members 22 and 29 with pin 26 passing through openings 30 and 32. It is obvious that if the lightning arrester 5 should be destroyed as for example by blowing off cap 5' as shown in Fig. 5, leaf spring 29 is free to move downwardly by virtue of its hinged connection with conducting plate 22 and the weight of cap 5' will pull terminal 31 free of pin 26 with no possibility of the dangling lightning arrester part short circuiting the power line connected to conductor 25.

The operation of the disconnecting device shown in Figs. 4, 5, and 6 will be obvious in view of the detailed disclosure above. The bearing of leaf spring 29 on lightning arrester cap 5' insures closure of the circuit between flexible lead 19 and terminal 4. It is furthermore obvious that the disconnecting devices described above are simple, inexpensive to manufacture, and positive in operation.

While we have shown and described particular embodiments of our invention, it will be obvious to those skilled in the art that various changes and modifications may be made without departing from our invention in its broader aspects and we therefore aim in the appended claims to cover all such changes and modifications as fall within the true spirit and scope of our invention.

What we claim as new and desire to secure by Letters Patent of the United States is:

1. An arrangement for electrically connecting a lightning arrester to the high voltage terminal of an electrical device having a grounded portion and for automatically disconnecting said lightning arrester from said electrical device upon destruction of said lightning arrester to prevent connecting said high voltage terminal to said grounded portion of said electrical device comprising a pair of relatively movable conducting members adapted to have a plurality of relative positions, one of said members being a rod-like T-shaped member with the arms of the T arranged in a substantially vertical position while the other of said members is a forked member, and a resilient element biasing said members in interlocking engagement when in one of said relative positions with the vertical arms of said T-shaped member engaged by the tines of said forked member, said forked member being connected to said lightning arrester so that the weight of the destroyed lightning arrester connected to said forked member causes rotation of said forked member and separation from said T-shaped member.

2. A device for connecting a lightning arrester to the high voltage terminal of an electrical device having a grounded portion and for automatically disconnecting said lightning arrester from said electrical device upon destruction of said lightning arrester to prevent connecting said high voltage terminal to said grounded portion of said electrical device comprising a pair of relatively separable conducting members, and a resilient member having one end thereof hinged to one of said relatively separable members while the other end rests on said lightning arrester for holding said members in current carrying engagement as long as said lightning arrester remains intact, said resilient member moving away from said one of said relatively separable conducting members in response to destruction of said lightning arrester to permit the other of said relatively separable members to fall free with said destroyed lightning arrester.

3. An arrangement for connecting a lightning arrester to the high voltage terminal of an electrical device having a grounded portion and for automatically disconnecting said lightning arrester from said electrical device upon destruction of the lightning arrester to prevent connecting said high voltage terminal to said grounded portion of the electrical device comprising a pair of cooperating conducting members, one of said members being stationary and the other of said members being movably separable therefrom and fixedly connected by a flexible conducting lead to a portion of said lightning arrester and a resilient member in stressed engagement with said lightning arrester for normally holding said conducting members in current carrying engagement as long as said lightning arrester remains intact, said resilient member being movable in response to the falling of said portion of said lightning arrester upon destruction thereof whereby said conducting members are disengaged.

4. An arrangement for electrically connecting a lightning arrester to the high voltage terminal of an electrical device having a grounded portion and for automatically disconnecting the lightning arrester electrically from said electrical device to prevent connecting said high voltage terminal electrically to said grounded portion of the electrical device upon the separation of the lightning arrester into a plurality of pieces comprising a pair of separable cooperating conducting members, one of said members being fixedly connected by a flexible conducting lead to a portion of said lightning arrester the other of said conductive members being electrically connected to the high voltage terminal of the electrical device, and a stressed resilient member normally holding said conducting members in current carrying engagement when said lightning arrester is intact but operative in response to the falling of said portion of said lightning arrester from its intact position upon separation of said arrester into pieces to permit said one of said conducting members which is fixedly connected to said falling portion to move out of engagement with the other of said conducting members.

LEWIS W. EVANS.
ARTHUR A. OLSEN.

REFERENCES CITED

The following references are of record in the file of this patent:

UNITED STATES PATENTS

| Number | Name | Date |
|---|---|---|
| 1,213,844 | Creighton | Jan. 30, 1917 |
| 2,149,070 | Poinan | Feb. 28, 1939 |
| 2,263,319 | Treanor | Nov. 18, 1941 |

FOREIGN PATENTS

| Number | Country | Date |
|---|---|---|
| 96,810 | Switzerland | Nov. 16, 1922 |

OTHER REFERENCES

"Crystal Valve Lightning Arresters," Catalog #390, May 15, 1937, of the Electric Service Supplies Co., pages 24 to 27.